(12) United States Patent
Goldberg et al.

(10) Patent No.: US 6,223,181 B1
(45) Date of Patent: Apr. 24, 2001

(54) MEMORY CONSERVING AND COMPRESSION TECHNIQUE-COMPATIBLE IMAGE ROTATION SYSTEM

(75) Inventors: Jonathan A. Goldberg, Musahino (JP); Peter Besen, North Andover; Donald Shulsinger, Newton, both of MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 08/904,158

(22) Filed: Jul. 31, 1997

(51) Int. Cl.[7] .................................................. G06F 12/00

(52) U.S. Cl. ..................... 707/101; 382/166; 382/173; 382/232; 382/235

(58) Field of Search ........................... 707/101; 382/232, 382/235, 166, 173

(56) References Cited

U.S. PATENT DOCUMENTS

| | | | |
|---|---|---|---|
| 4,168,488 | 9/1979 | Evans | 340/146.3 |
| 4,271,476 | * 6/1981 | Lotspiech | 382/235 |
| 4,467,448 | 8/1984 | Regehr et al. | 364/900 |
| 4,545,069 | 10/1985 | Kermisch | 382/46 |
| 4,627,020 | 12/1986 | Anderson et al. | 364/900 |
| 4,658,430 | 4/1987 | Anderson et al. | 382/46 |
| 4,695,895 | * 9/1987 | Nagashima | 358/280 |
| 4,706,205 | * 11/1987 | Aka et al. | 364/518 |
| 4,776,026 | 10/1988 | Ueyama | 382/46 |
| 4,783,834 | 11/1988 | Anderson et al. | 382/46 |

(List continued on next page.)

FOREIGN PATENT DOCUMENTS

| | | |
|---|---|---|
| 0 235 456 A2 | 9/1987 | (EP) . |
| 0 609 622 A1 | 8/1994 | (EP) . |
| WO 96/39681 | 12/1996 | (WO) . |

OTHER PUBLICATIONS

Casey et al., "Parallel Linear Transformation on Two–Dimensional Binary Images", Apr., 1971, IBM Technical Disclosure Bulletin, vol. 13, No. 11, pp. 3267–3268.

Gold, et al., "Shift Register System for Image Orientation", Jan. 1976, IBM Technical Disclosure Bulletin, vol. 18, No. 8, pp. 2633–2639.

D.E. Gold, "Shift Register Implemented Image Rotator/Transposer", Dec. 1985, IBM Technical Disclosure Bulletin, vol., 17 No. 10, pp. 3026–3028.

"Image Rotating System", Dec. 1985, IBM Technical Disclosure Bulletin, vol. 28, No. 7, pp. 3063–3065.

J.O. Eklundh, Correspondence, "A Fast Computer Method For Matrix Transposing", IEEE Transactions on Computers, Jul., 1992, pp. 9–11.

*Primary Examiner*—Jean R. Homere
(74) *Attorney, Agent, or Firm*—Testa, Hurwitz and Thibeault

(57) ABSTRACT

An image processing system for performing rotation of an image reduces the size of the memory buffer needed for rotation while ensuring that rotation is compatible with a variety of compression techniques. A processing module determines whether a memory buffer sized to accommodate the entire image should be used, or whether a smaller memory buffer can be used to rotate smaller sized image sections. When the image data fills the selected memory buffer, rotation processing of the image data can then commence, regardless of whether the entire input image has been received by the processing module. A rotation module operates on incoming image data stored in the memory buffer, causing rotation of the image data and transfer to an encoder/decoder module where the image data is compressed in accordance with one or more compression techniques. After compression, the image data is stored in random memory locations. When the rotated image is requested by the output device, the sections are retrieved, decompressed and reconstructed in accordance with appropriate compression techniques.

20 Claims, 6 Drawing Sheets

U.S. PATENT DOCUMENTS

| | | |
|---|---|---|
| 4,837,845 | 6/1989 | Pruett et al. ............................ 382/46 |
| 4,970,682 | 11/1990 | Beckwith, Jr. et al. ............. 364/900 |
| 4,975,977 | 12/1990 | Kurosu et al. ......................... 382/46 |
| 5,034,733 | 7/1991 | Okazawa et al. .................... 340/727 |
| 5,081,700 | 1/1992 | Crozier ................................ 395/150 |
| 5,111,192 | 5/1992 | Kadakia ............................... 340/727 |
| 5,199,101 | 3/1993 | Cusick et al. ........................ 393/115 |
| 5,295,237 | 3/1994 | Park ..................................... 395/137 |
| 5,365,601 | 11/1994 | Kadakia et al. ....................... 382/46 |
| 5,396,236 | 3/1995 | Ueda ...................................... 341/50 |
| 5,450,604 | 9/1995 | Davies ................................. 395/800 |
| 5,483,354 | 1/1996 | Kessels et al. ....................... 358/444 |
| 5,557,715 | 9/1996 | Ichiyanagi ........................... 395/137 |
| 5,638,464 * | 6/1997 | Kawamura ........................... 382/232 |
| 5,671,299 * | 9/1997 | Oshida ................................. 382/307 |
| 5,732,202 * | 3/1998 | Okamoto ............................. 385/117 |
| 5,751,865 * | 5/1998 | Micco et al. ......................... 382/296 |
| 5,758,043 * | 5/1998 | Takizawa et al. ................... 395/115 |

* cited by examiner

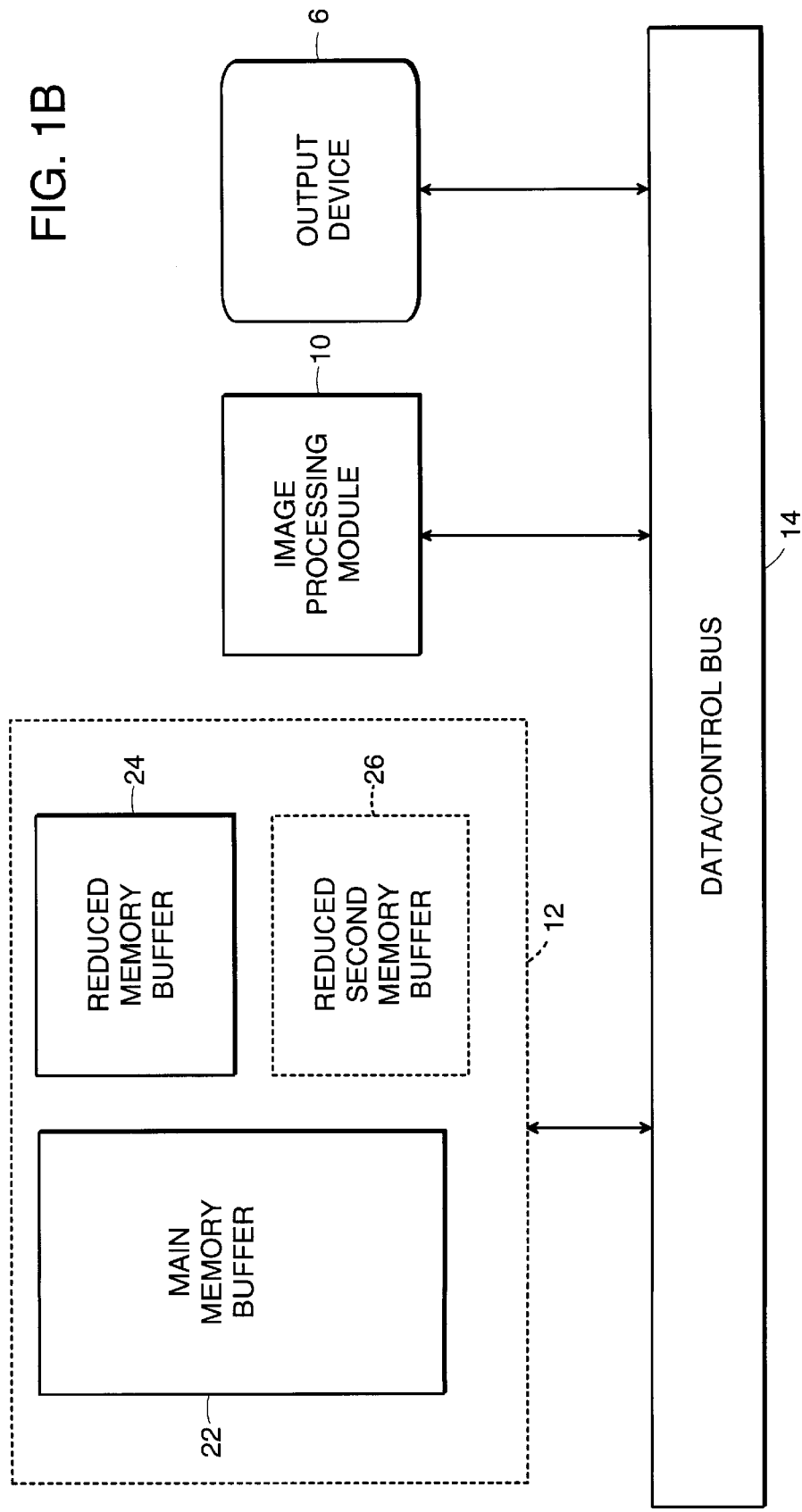

MEMORY CONSERVING AND COMPRESSION TECHNIQUE-COMPATIBLE IMAGE ROTATION SYSTEM

FIELD OF THE INVENTION

This invention relates generally to an image processing system and method for rotating an image. In particular, this invention relates to an image processing system that conserves memory during rotation while providing flexibility in the techniques that can be used for image reconstruction.

BACKGROUND OF THE INVENTION

As complex image processing systems, such as printers, facsimile machines, and electronic devices become more advanced, it is often necessary for original images having a scan format in one direction, to be transferred to an output device having a scan format in a different direction. As such, it has become increasingly necessary to perform rotation processing on an image prior to transferring the image to the output device. Given that the amount of system memory needed for rotation processing can often be great due to the size and content of the image being processed, conservation of memory during rotation has become an important consideration in image processing design.

An image processing system that has attempted to solve the problem of conservation of memory is described in U.S. Pat. No. 4,271,476 to Lotspiech ("the '476 patent"). In this system, a digital image can be rotated into a vertical scan format for printing. In an effort to conserve memory, a processor determines when a nominal amount of the image is present in a file, and then rotates and compresses the image. Adjacent portions of the image are thus rotated, compressed and stored in adjacent memory locations, where an electronic knitting of adjacent image boundaries takes place. The knitting process is the digital integration of a portion of compressed image data with adjacent portions. As described in this patent, when each portion of the image is integrated with other compressed portions, reconstruction of the entire rotated image can take place using a run length decoding technique.

Although memory is saved in the system of the '476 patent, there are problems associated with such a system. In particular, the knitting process can only be carried out on adjacent blocks, thus limiting the areas of memory in which compressed portions of the image can be stored. Moreover, the knitting technique cannot be used with other standard compression techniques such as Joint Bitonal Imaging Experts Group (JBIG), in which a current value of a compressed image block depends on data existing in memory in blocks that are not adjacent to the image block.

It is therefore an object of the present invention to provide a system for performing rotation of an image, that is capable of reducing the memory needed for rotation while providing flexibility in the compression techniques that can be used to reconstruct the image.

SUMMARY OF THE INVENTION

The present invention relates to an image processing system and method for performing rotation of an image. The image processing system independently rotates, compresses and stores image sections, resulting in a conservation of memory and an increased compatibility with differing compression techniques.

In one embodiment, the present invention comprises an image processing module and a memory module having one or more buffers of reduced size. The image processing module comprises a processing module, an encoder/decoder module and a rotator module. In one embodiment, the processing module determines whether a memory buffer sized to accommodate the entire image should be used, or whether a smaller memory buffer should be used to rotate smaller sized image sections. In the event that the image is of a certain size and division into smaller sections is desirable, rotation processing commences when an image section fills the selected memory buffer. The rotation module operates on each image section independently, such that each section is rotated by 90° and transferred to an encoder/decoder module where each section is compressed in accordance with one or more compression techniques.

After compression, each of the compressed sections are stored in separate, and random memory locations. The random memory locations can further be memory locations that are not adjacent, that is, non-contiguous locations in the memory module. When the rotated image is requested by the output device, one or more of the sections are retrieved, decompressed and reconstructed in accordance with appropriate compression techniques.

The system and method of the present invention thus eliminates the need to use a large memory buffer to rotate and compress the entire image. Additionally, the system and method of the present invention further eliminates the need to store the rotated and compressed image sections in contiguous locations in memory for proper reconstruction thereof. Moreover, as the sections of the image can be rotated and compressed independently, the system and method of the present invention allows differing compression techniques to be used on different sections of the image.

The foregoing and other objects, features, and advantages of the invention will become apparent from the following, more particular description of the preferred embodiments of the invention, as illustrated in the accompanying drawings.

BRIEF DESCRIPTION OF THE DRAWINGS

FIG. 1B is a block diagram of a memory module used in the image processing system according to an embodiment of the present invention.

DETAILED DESCRIPTION OF THE INVENTION

Figure 1A:
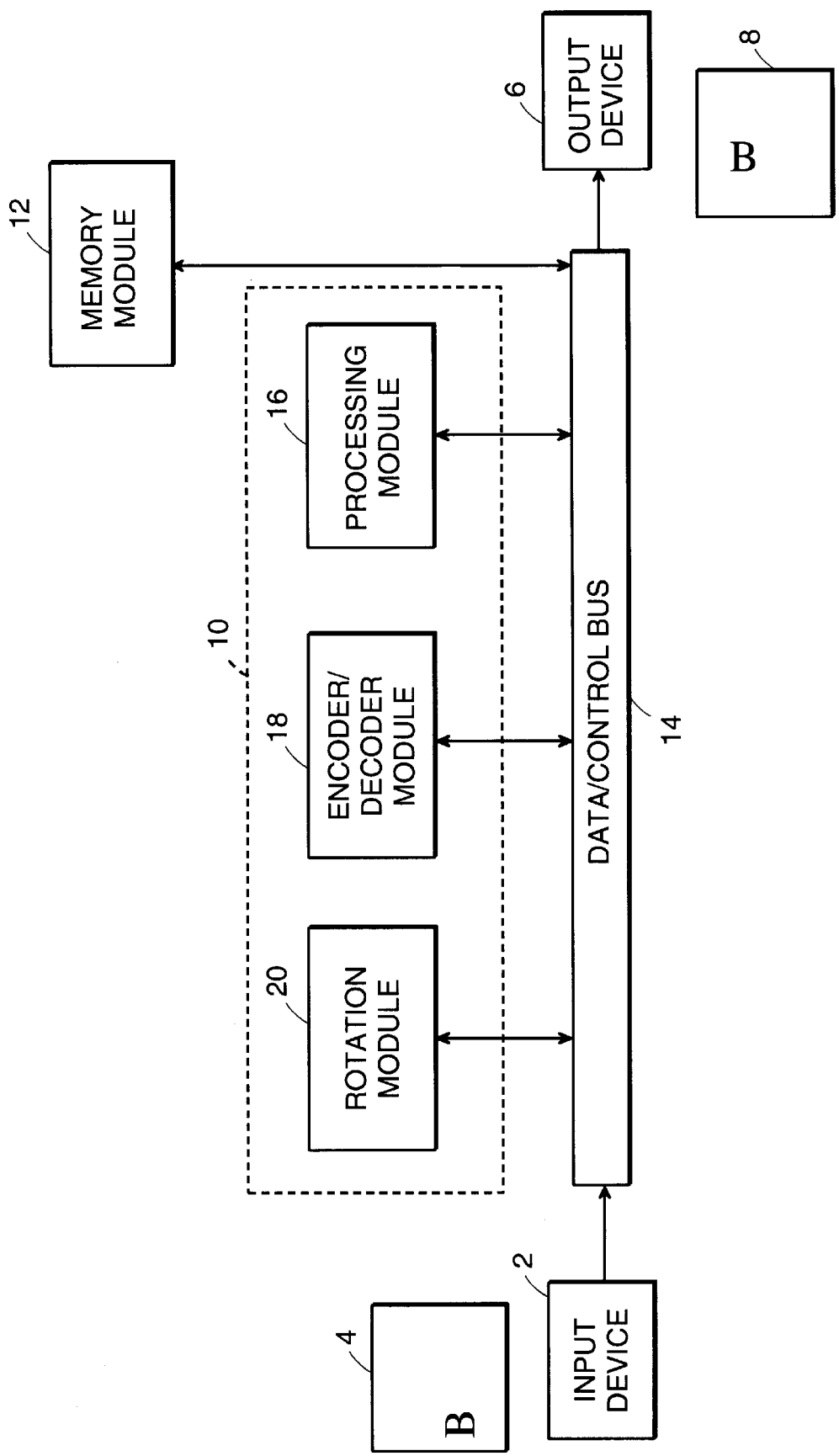
FIG. 1A is a block diagram of an image processing system for performing rotation of an image according to embodiment of the invention.

Referring to FIG. 1A, shown is a block diagram of an image processing system 1 for rotating an image according to one embodiment of the present invention. As shown in this FIG., the system 1 can receive from an input device 2 such as a scanner (i.e. a scanner CCD or an external scanner), a personal computer, facsimile machine or other electronic device, a digital image 4; and can provide to an output device 6, such as a printer (i.e. a print engine or external printer), personal computer, computer display, facsimile machine or other electronic device, a rotated version 8 of the image. The digital image is provided to the system 1 as a collection of pixels that represent visual data. The system 1 comprises an image processing module 10 capable of performing rotation, compression and decompression of an image, a memory module 12 having one or more memory buffers for storing the image as well as a rotated version of the image, and a data/control bus 14 over which communication between the above-referenced modules can take place.

As shown, the input device 2 provides to the data bus 14, a digital image 4. In this embodiment, the input device may comprise a scanning engine for scanning an image, such as the letter B, from a sheet of paper. The digital image 4 is then transmitted via the data bus 14 to the image processing module 10, which generates a rotated image and provides the rotated image to the output device 6. The image processing module 10 comprises a processing module 16, an encoder/decoder module 18, and a rotation module 20. The processing module 16 can include a logic circuit, microprocessor, CPU, or microcomputer, for coordinating rotation and compression of the image using the other modules. In particular, the processing module 16 can receive the digital image, determine the size of the memory buffer needed in the memory module 12 to rotate the image, and communicate with the rotation module 20 to initiate rotation processing.

After rotation of the image has taken place, the processing module 16 can further communicate with the encoder/decoder module 18 to compress the rotated image. The processing module 16 can then initiate storage of the compressed image into one or more memory locations (not shown) in the memory module 12. When a rotated version of the image is desired, such as, when the output device 6 sends a signal to the processing module 16 requesting the rotated image, the processing module 16 directs the encoder/decoder module 18 to decompress the image and a rotated version of the image is reconstructed. The memory module 12 can include RAM, SRAM, a hard drive or other digital storage medium. The memory module 12, as further described, is capable of storing the entire image as well as a rotated version of the image.

As the input image can be large, the system 1 of the present invention seeks to reduce the size of the memory buffer needed for rotation while ensuring that rotation can be properly carried out using a variety of compression techniques. The digital image, as described above, comprises a collection of pixels that represent visual data. A block of image data is a rectangular matrix of pixels. A section of an image is typically one or more blocks of data. The size of a section is generally dependent on the system design, that is the amount of memory available and performance requirements, as well as the size of the individual image being processed. A band of an image is typically a row or column of one or more sections. When an image is large, such as, for example, in the case of a high-resolution image scanned in from a 8.5 by 11 sheet of paper, the processing module can determine whether a memory buffer sized to accommodate the entire image (i.e. an n×n matrix) should be used; or whether a smaller memory buffer, (i.e. a p×p matrix buffer, where p is less than n) can be used to rotate the image in sections, that is, the image is rotated in smaller sized partial images.

The processing module can receive data relating to the size of the image as the image is being scanned in, or alternatively, can receive data relating to the size of the image after the image has been scanned in and stored in the memory module 12. Upon determining the image size, a determination of appropriate buffer size in the memory module 12 can be made. As will be further shown and described in FIG. 1B, the memory module 12 can include one or more reduced buffers that are pre-allocated. In another embodiment, the buffers can be dynamically allocated depending on the size and content of the image.

In one embodiment, the processing module 16 can determine whether the image is larger than a predetermined buffer size considered by the processor as an upper size limit for image rotation. If the image is larger than such a predetermined buffer size, the processing module can divide the image into image sections which can be processed for rotation in a memory buffer of reduced size. In an alternative embodiment, the processing module 16 can automatically divide the input image data into sections upon determining the size of the input image. In such an embodiment, the buffer size for rotation can simply be large enough to store a band of image data. For example, an image on a 600 dots-per-inch (dpi) page can require 5100 pixels by 6600 pixels. The image can be broken into 100 sections, each section being 510×660 pixels. In this example, each section can be rotated separately in a 510×660 memory buffer. Thus, a buffer of reduced size results in a conservation of memory, as only a portion of the memory is required for rotation.

Referring briefly to FIG. 1B, the memory module 12 can include a plurality of buffers, such as, for example, a main memory buffer 22 for receiving and storing the input image and the final rotated image and a reduced memory buffer 24 for storing the entire image or simply a section of an image undergoing rotation processing. It is important to note that the memory module 12 described in this FIG. can take the form of a single memory buffer that can be dynamically allocated by the processing module, depending on the size or content of the input image, to provide the buffers 22 and 24.

In the event that a buffer of reduced size is used, only sections of the image can be held in the buffer at a time. In one embodiment, an image can be fed to a buffer of reduced size as the image is received by the processing module 16. In such embodiment, when the image data fills the buffer, processing of the image data can then commence, regardless of whether the entire input image has been received by the processing module. The section of the image in the buffer can then be processed by the rotation module 20 and encoding/decoder module 18 as remaining sections of the image are being inputted. Alternatively, the entire input image can be stored in the memory module 12 and subsequently divided into sections, whereupon each section can be transferred to a buffer of reduced size for processing.

When the image data is transferred to a memory buffer 24 in the memory module 12, the processing module 16 communicates with the rotation module 20 such that rotation processing commences. As further described herein, the rotation module 20 operates on incoming data stored in the memory buffer 24 in the memory module 12, causing such data to be read out in a different order than the order in which it was stored, thus resulting in rotation thereof. After the data is read out from the memory buffer 24, the encoder/decoder module 18 causes such data to be compressed in accordance with one or more compression techniques as described in further detail herein. After compressing in the memory buffer 24, the data, which as stated above, can be the entire image, or sections of the image, the compressed data is transferred over the data bus and stored in the memory module 12. The compressed data remains in the memory module 12 until the rotated image is desired by the output device. As will be further described in one embodiment of the invention, the memory module 12 preferably holds sections of the rotated image in a random memory locations, such as, non-contiguous memory locations, as further described in FIG. 4.

When the rotated image is to be transferred to an output device 6, the image or sections of the image are transferred over the data bus 14 to the encoder/decoder module 18, where decompression of the image or image sections takes place. The compressed rotated sections are then stored in random locations in the memory module 12. When decompression and image reconstruction is carried out on such sections, the sections are retrieved and decompressed according to a predetermined sequence, which is generally governed by one or more compression techniques. After decompression, the processing module reconstructs the image or a portion of the image and transmits the rotated digital image to the output device 6.

Referring again to FIG. 1B, the input image can be transferred to the reduced memory buffer 24 as the image is being fed to the main memory buffer 22 from the input device 2. Alternatively, the image can be transferred after the entire input image has been stored in the main memory buffer 22. Upon receiving at least a section of the image in the reduced memory buffer 24, the image processing module can perform rotation and compression thereon. The rotated and compressed image can then be stored in non-contiguous locations the main memory buffer 24. When the rotated image is to be transferred to the output device 6, the image processing module 10 can retrieve the image or image sections from the main memory buffer 22, initiate decompression thereon, and transfer the image to the output device 6. As shown in this embodiment, the memory module 12 can further include an optional reduced second memory buffer 26 for storing one or all of the decompressed rotated sections of the image prior to transfer of the reconstructed, rotated image to the output device 6.

Figure 2A:
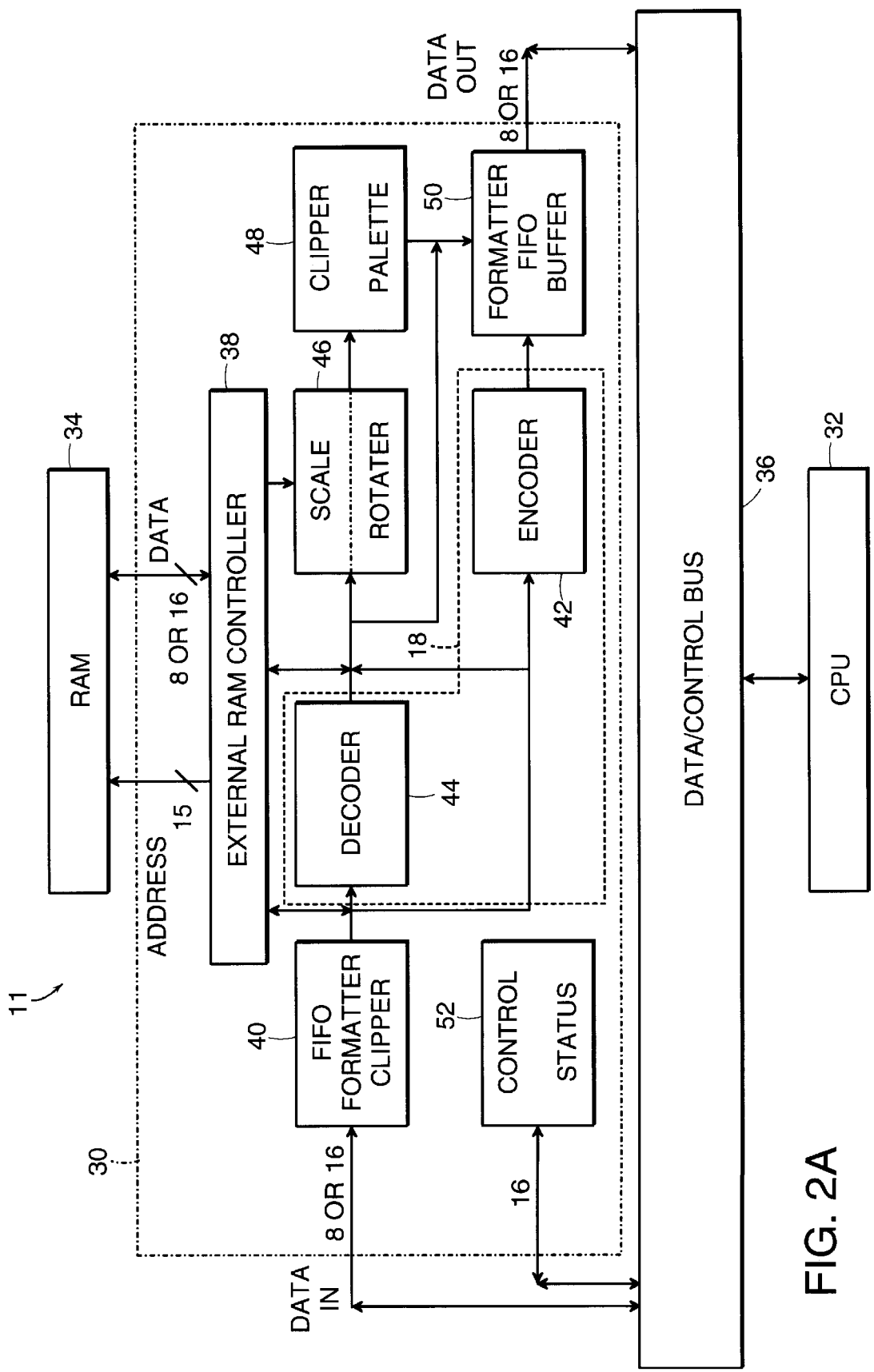
FIG. 2A is a block diagram of a computer chip in an image processing system for performing rotation of an image according to another embodiment of the invention.

Referring to FIG. 2A, shown is a block diagram of an illustrative embodiment of the present invention wherein the system 11 for performing rotation of an image is embodied in an image processing chip 30 (i.e. a microchip). The image processing chip 30 described in this embodiment of the present invention can be programmed to perform rotation on images comprising bitonal data, and can perform other finctions as herein described. In other embodiments, the system of the present invention can be used to rotate color and grayscale data. As similarly described above, the system 11 includes a processing module 32, shown in this embodiment as a CPU, and a memory module 34, shown in this embodiment as a RAM. As shown, the image processing chip 30 communicates with the CPU 32 via a data/control bus 36 and communicates with the RAM 34 via an external RAM controller 38. The chip can further interface with an external SRAM (not shown) for storage of interim data during processing.

A digital image is transferred to the image processing chip 30 via the data/control bus 36, and is transferred initially to the FIFO (i.e. first in first out) & formatter/clipper module 40, hereinafter referred to as the input FFC module 40. The portion of the input FFC module 40 dedicated to FIFO functions can be a 16 bit wide, 64 element deep, register that supports data transfer as well as transfer of diagnostic commands to the modules embodied on the chip 30. In another embodiment, the FIFO can be eliminated, and similar input devices external to the chip 30 can be used in its place. The portion of the input FFC module 40 dedicated to formatting, that is, the formatter, can provide bit-swap and byte-swap logic for converting input data to an internal format acceptable to the chip 30. The portion of the input FFC module 40 dedicated to clipping performs a windowing function, that is, it receives data from the formatter and discards data falling outside of a programmable region of interest. This portion of the FFC module 40 can further determine the dimensions of an input image. For example, the clipping portion of this module can comprise registers that can be used to define image width and image height. In an alternate embodiment, the FFC module 40 need not possess a clipping function. Such an embodiment can be useful when windowing of an input image is not required, or in instances when the input image is encoded.

As shown in this embodiment, the input FFC module 40 communicates with an encoder module 42 and a decoder module 44, as similarly described above with respect to the encoder/decoder module 18. The encoder module 42 can receive input image data, such as, for example, bitonal input images transferred from the FFC module 40, and convert such input image data to compressed image data. The encoder module 42 can perform the following compression techniques; MH, MR, MMR and JBIG. The compression technique known as MH refers to Modified Huffman encoding and is a one-dimensional scanning technique. In this compression technique, the image is initially scanned in lines, that is, the image is run-length encoded, and then the run-lengths are Huffman-encoded. This compression technique is also known as "Group 3" in facsimile jargon. The compression techniques known as MR and MMR, are referred to as Modified Read and Modified Modified Read. These are two dimensional encoding techniques, that is, the image is scanned in lines such that a current line uses a previously scanned line as a reference. In MR, one-dimensional and two-dimensional encoding is used, while in MMR, only two-dimensional encoding is used. MR and MMR are referred to as "Group 3 -2D" in facsimile jargon. The compression technique known as JBIG refers to Joint Bitonal Imaging Experts Group, and is an adaptive predictive encoding technique that uses arithmetic encoding. The above compression techniques are lossless, that is, none or very little of the image is lost during compression.

The encoder module 42 can, in alternate embodiments, can use the JPEG and other compression techniques on color and grayscale data. The compression technique known as JPEG refers to Joint Photographic Experts Group. This technique transforms color and grayscale data to a frequency domain using discrete Fourier transform processing, and drops high frequency components of the image that are not visible to the human eye. This is a known as a "lossy" compression technique because some of the image is lost, although the part of the image that is lost is not relevant to image reconstruction.

The decoder module 44 can perform the opposite function of the encoder module 42, that is, the decoder module 44 can decompress the compressed image data and can provide bitonal output images. Both the encoder module 42 and the decoder module 44 communicate with the RAM 34 via the external RAM controller 38 to retrieve and store both bitonal image data and compressed image data.

As shown, the encoder module 42 and the decoder module 44 are in communication with the scaler/rotator module 46. The scaler portion of the scaler/rotator module 46 can interpolate bitonal images for transfer to the clipper/palette module. The rotator portion of the scaler/rotator module 46 applies orthogonal rotation factors to image data stored in a memory buffer in the RAM 34, or to image data received from the FFC module 40. In the present embodiment, the rotator portion of the scaler/rotator module 46 can perform rotation on blocks of 8×8, 16×16, or 32×32 pixels stored in memory buffers of appropriate size, as further described. The rotator is typically enabled when the scaler is disabled and vice-versa.

The external RAM controller 38 can, in the present embodiment, arbitrate and manage up to 64K of RAM 34 used by the encoder 42, decoder 44, and the scaler/rotator module 46 during storage and retrieval of data. The RAM controller 38 can further be programmed to dynamically allocate memory buffers in RAM 34 based on the size and content of the input image data. For example, the RAM controller 38 can assume the functions described above in connection with the processing module 32, such that after the size of an image is determined by the input FFC module 40, a buffer of appropriate size is allocated in the RAM 34 for rotation. Alternatively, where an SRAM is used, an SRAM controller can perform such a function.

As the rotator of the present embodiment can perform rotation processing on a block sizes of 8×8, 16×16, or 32×32 pixels, the rotation of an image section must be done on a block by block basis until the entire section is rotated in the memory buffer 26. It is to be appreciated, however, that these sizes are to be taken as illustrative rather than as restrictive, as in other embodiments of the present invention, the rotator portion of the scaler/rotator module 46 can perform rotation processing on larger or smaller images, and therefore, the buffer size can vary accordingly. In the present embodiment, the memory buffer 24 preferably contains at least a section of the image. In other embodiments, the memory buffer can contain a band, or entire row of sections, with each section being rotated individually.

In the embodiment of FIG. 2A, the size of a section can be determined by the software or logic of the processing module 32, and can vary with the system design and the size of the individual image being processed. In particular, the section size can be determined by processing the available memory in the RAM 34, overall system performance requirements, compression techniques, and image size and resolution. The minimum size of a section in the present embodiment is about equivalent to the block size of the scaler/rotator module 46, that is, a 8×8, 16×16, 32×32 matrix. The maximum size of a section is preferably the size of the entire image. In another embodiment of the invention, the section size is dynamically determined on a image-by-image basis, with an average image divided into 10×10 sections provided the sections are no smaller than 512×512 pixels.

The scaler/rotator module 46 is in communication with an output clipper/palette module 48. The output clipper can perform windowing functions on output images received from the decoder or the input clipper. The palette is a programmable look-up table that maps the output of the scaler to output pixels. The palette can further be programmed to perform such image processing functions as error diffusion, redithering or spatial filtering. The clipper/palette module 48 is in communication with an output FFC module 50 that performs a similar function as the input FFC module 40, that is, the output FFC module 50 supports data transfer, bit and byte-swapping, as well as clipping. The chip 30 further includes a system controller 52 that provides access to control and status registers (not shown) on the chip.

Figure 2B:
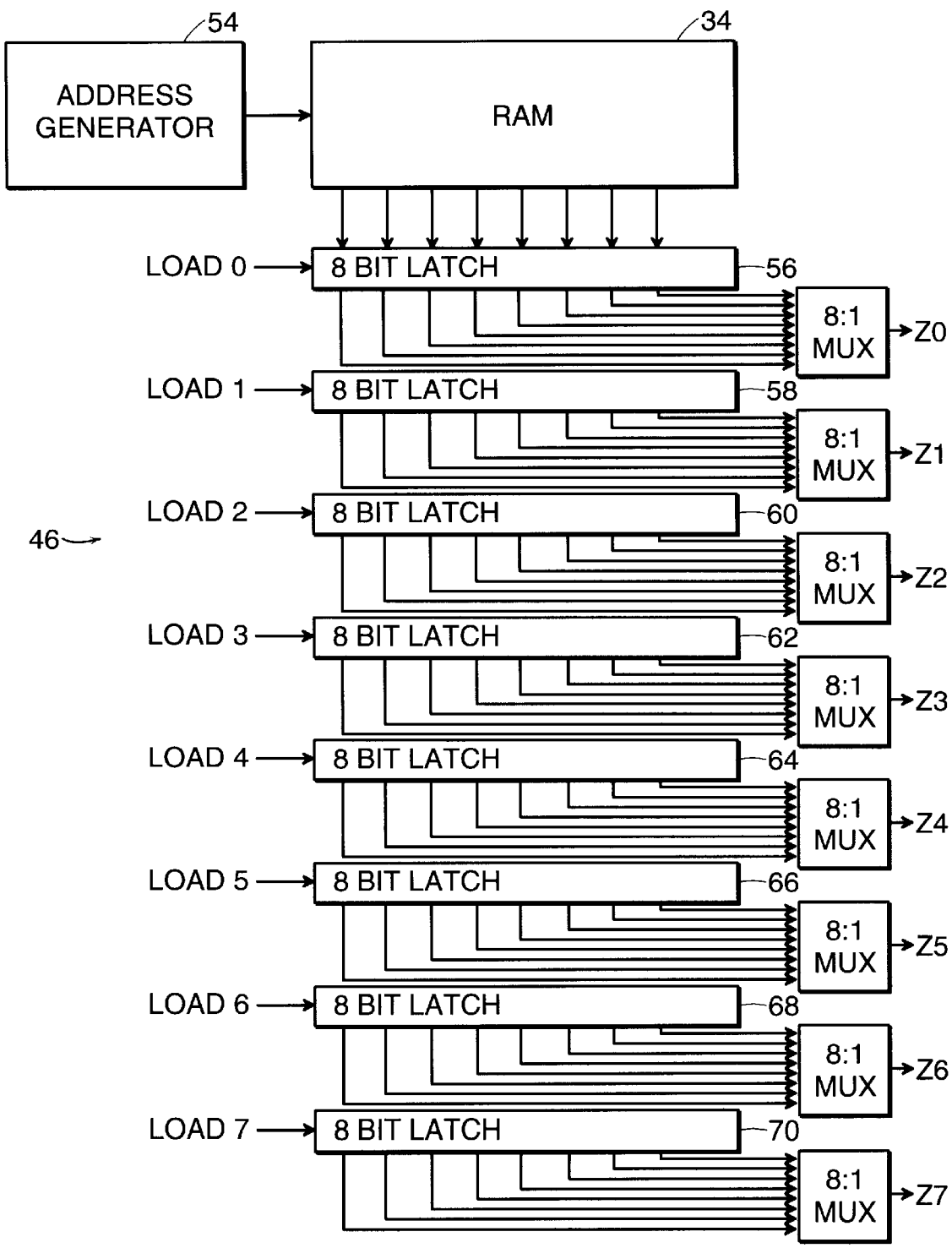
FIG. 2B is a diagrammatic illustration of an embodiment of the method in which the rotation module rotates an image.

Referring again to the rotator 46, in the present embodiment, the rotator 46 can perform a 90°, 180°, or 270° rotation on the image or a section of the image stored in the memory buffer allocated in RAM 34 as described above. As shown in FIG. 2B, one embodiment of the rotator 46 is shown that implements rotation of an 8 bit by 8 bit matrix held in a memory buffer in RAM 34.

Upon receiving an input image, the RAM 34 writes the incoming data into sequential memory locations in a reduced memory buffer. The address is advanced whenever input data is present and there is space available in the buffer. In this embodiment, data is read from the RAM buffer as 8 items of data, beginning at a certain starting location. The address generator 54 from which data is read is then advanced by a number of locations defined by the line width in pixels divided by the RAM 34 width in pixels, referred to as the pitch. The data read from RAM 34 can then be stored in a plurality of 8 bit wide registers 56, 58, 60, 62, 64, 66, 68, 70, as shown by load 0 through load 7. The RAM 34 then waits for synchronization from the register read process carried out by the rotator 46.

The register read process selects one bit from each of the 8 bit registers 56–70. The process normally begins at either the least significant or most significant bit of the registers. The selected bits then become the output, as given by $Z0$ through $Z7$. This process then takes the next bit from the registers and outputs those next bits, continuing until all bits are outputted. At that point, the RAM 34 read process is signaled to resume, and the address generator 54 advances the starting location by one address and begins again. In the present embodiment, this process continues until all the data for the 8 lines has been outputted. The RAM 34 read process then waits for the 8 lines of data in RAM 34 and begins the process on the next sequential group of 8 lines, where the next group address to be rotated is defined as:

next group address=(8) * Pitch

As stated above, the pitch is equivalent to the line width in pixels divided by the RAM 34 width in pixels. In another embodiment, the rotation process of the present embodiment can be carried out using an SRAM that is double buffered. In such embodiment, the write process can fill a second memory buffer in the SRAM while the read process empties a first memory buffer in the SRAM.

The rotation process described above is preferably repeated until all or a portion of the image is rotated. As an image or an image section can be expressed as a matrix of blocks, where each block comprises a rectangular group of pixels, a block is rotated when the pixels within the block are rotated. When each block in the image is rotated, rotation processing for the image is considered complete. It is to be appreciated that the rotation process described above is illustrative, and that the rotator of the present invention can perform image rotation using other rotation techniques known to those of skill in the art of image processing.

Figure 3:
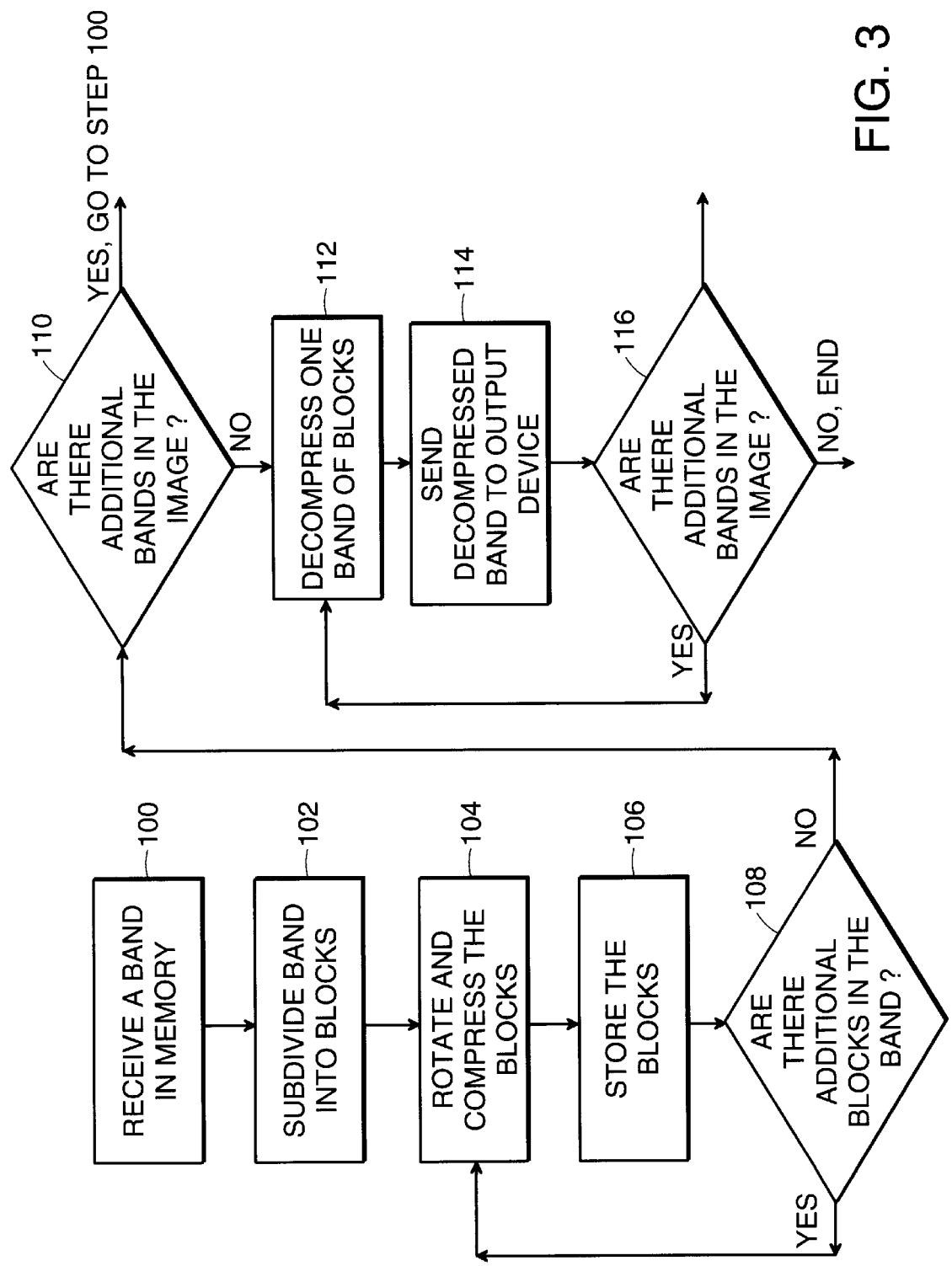
FIG. 3 is a flow chart showing a method of performing rotation of an image according to an embodiment of the present invention.

Referring to FIG. 3, shown is a flow chart illustrating one embodiment of the method in which an image is processed by the system of the present invention. For purposes of illustration only, this flow chart is described with reference to the elements described in the embodiment of FIG. 1A. Referring to step 100, a band is received in the memory module. In step 102, the processing module divides the band into sections, which for example, can each comprise, for purposes of illustration only, a single block. In this step, each block is successively stored in the buffer of reduced size, as described above. As described above, the buffer of reduced size can be equivalent to a section of an input image. In step 104, the rotation module rotates the blocks and transfers the blocks to the encoder/decoder module where each block is compressed. In step 106, the encoder/decoder module transfers the blocks to the memory module where the compressed blocks are stored. In step 108, the processing module determines whether additional blocks exist in the band. If this query is answered affirmatively, control is routed again to step 104, and any remaining blocks are rotated and compressed in steps 106 and 108. When the processing module determines in step 108 that no additional blocks exist in the band, control is routed to step 110, where the processing module determines if additional bands exist in the image. If this query is answered affirmatively, control is again routed to step 100, and steps 102 through 110 are again executed. When it is determined in step 110, that no additional bands exist in the image, image rotation is completed.

It is to be appreciated that after the blocks in a band are rotated, compressed and stored in random memory locations, data relating to the set of blocks that formed the band need not be preserved, as a different set of blocks will be used to form a band of the rotated, reconstructed image. For example, a row of blocks is typically rotated and compressed in the order in which the blocks appeared in the row. However, to obtain a row in the rotated image, the blocks are retrieved from memory and decompressed in an order that differs from the order in which they were initially compressed. The order in which the compressed blocks are decompressed to form the new bands of the reconstructed image is determined by the decompression technique.

Returning to FIG. 3, after rotation and compression of the entire image is carried out, control then passes to step 112, in which image decompression is carried out. In another embodiment, an additional step can reside in between steps 110 and 112, that is, step 112 can be initiated in response to a signal from an output device requesting the rotated image. In the present embodiment, however, a band is decompressed in step 112 shortly after the last band of the image is compressed. As shown in step 114, upon decompressing a band of image data, the decompressed band is sent to the output device. In this manner, either the entire rotated image, or simply a band of the rotated image can be sent to the output device. Control is then routed to step 116, where the processing module determines whether there are additional bands in the image that require decompression. If this query is answered affirmatively, such as, where the entire rotated image is desired by the output device, or simply another band of image is desired, control is again routed back to step 112, and another band is decompressed and transferred to the output device. When the query of step 116 indicates that no additional compressed bands exist, the rotated image or at least a desired portion thereof has been transferred to the output device and rotation processing ends.

Figure 4:
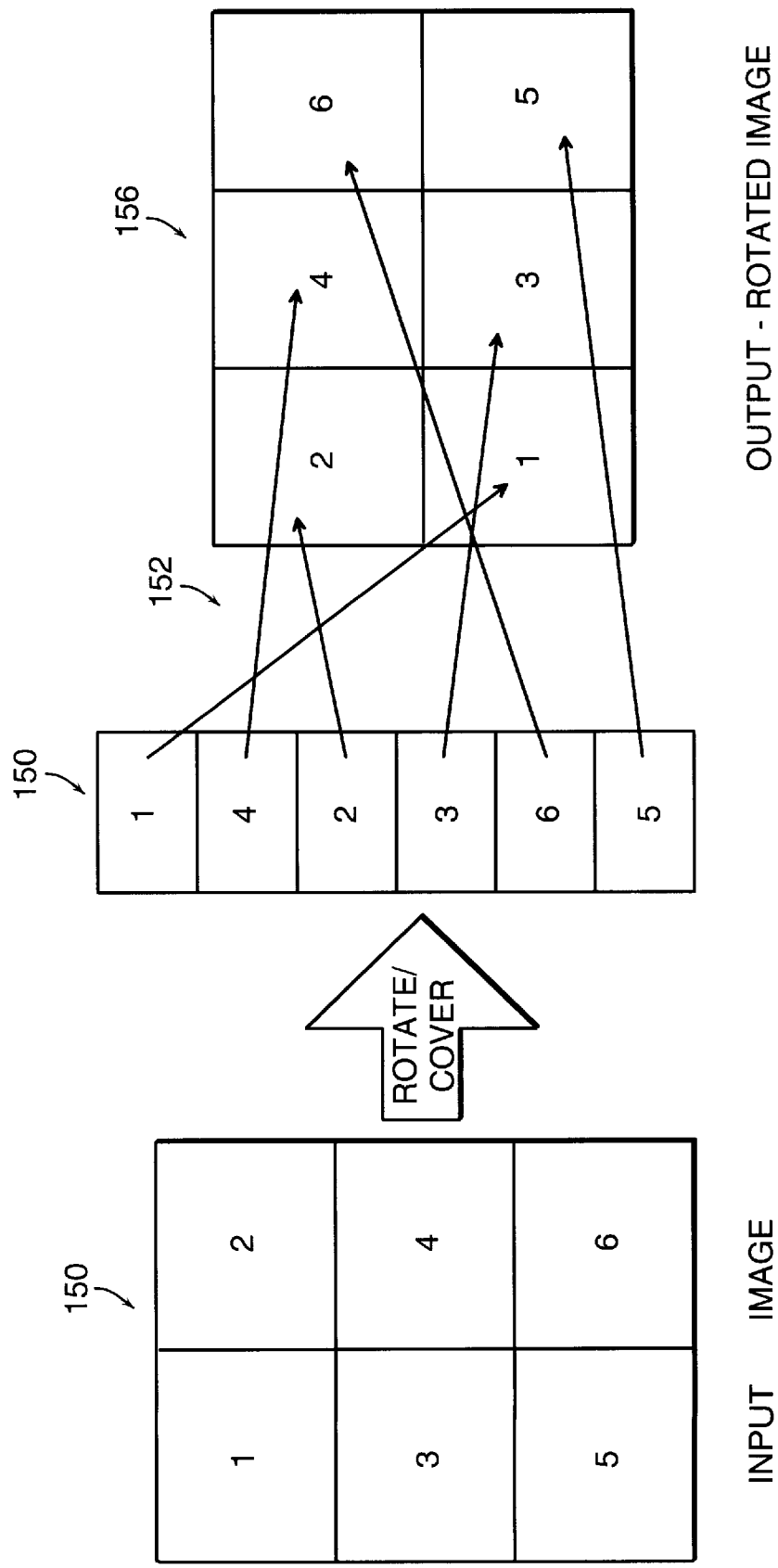
FIG. 4 is a diagrammatic illustration of the method in which an input image can be divided into image sections, rotated and recombined, according to an embodiment of the present invention.

Referring to FIG. 4, the above-described processing steps are further illustrated in a diagrammatic format. As shown in this FIG., a band of an input image 150 is divided into a plurality of blocks 1 through 6, each of which as described above, comprises a group of pixels. The blocks are then rotated and compressed according to one or more compression techniques and stored in memory in a random order 152. As shown, block 1 is not contiguous to block 2, and so on. When reconstruction of the image is desired, the compression technique originally used, determines the sequence in which the compressed rotated sections should be retrieved from memory, as given by 154. As shown in this embodiment, the manner in which the sections are stored 152 can have relatively little to no bearing on the method in which the image is reconstructed. These sections are retrieved, decompressed, and reconfigured in an order governed by the compression/decompression technique to provide the rotated output image 156. As the blocks of image data are independently compressed and not integrated prior to reconstruction, the data in each block in memory 152 is independent from the data in all other blocks. As such, the present invention can permit less than the total number of blocks in the image to be decompressed and transferred to the output device, or alternatively, can allow the blocks to be decompressed in accordance with differing compression techniques.

While the invention has been particularly shown and described with reference to the preferred embodiments, it should be understood by those skilled in the art that various changes in form and detail may be made therein without departing from the spirit and scope of the invention as defined by the appended claims.

What is claimed is:

1. An image processing chip comprising:
   an input/output bus for receiving sequentially a stream of data defining a digital image from an input device;
   a memory module for receiving the digital image;
   a processing module for dividing the digital image into sections;
   a memory buffer in communication with the bus having the capacity to store at least a section of the received digital image;
   a rotation module accessing the memory buffer for rotating the section of the image stored in the memory buffer;
   a compression module in communication with the rotation module and the memory module for compressing each rotated section of the image and storing each compressed rotated section of the image in random memory locations in the memory module;
   a decompression module accessing the memory module for decompressing each rotated compressed section of the image; and
   a control module in communication with the decompression module for combining the rotated sections of the image, according to a predetermined sequence independent of the memory locations in which the sections are stored, to create a sequential stream of data defining a rotated version of the digital image for the output device.

2. The image processing chip according to claim 1, wherein the rotation module rotates each section of the digital image in increments of 90°.

3. The image processing chip according to claim 1, wherein the memory buffer is an 8×8, 16×16, or 32×32 matrix.

4. The image processing chip according to claim 1, wherein the input device comprises a scanner.

5. The image processing chip according to claim 1, wherein the output device comprises a printer, a computer display and a facsimile machine.

6. The image processing chip according to claim 1, wherein the predetermined sequence is dependent upon the compression technique.

7. The image processing chip according to claim 6, wherein the compression technique includes one or more of the following techniques: MH, MR, MMR, JBIG and JPEG.

8. The image processing chip according to claim 1, wherein the random memory locations are not contiguous.

9. In an image processing system including an input device for providing an n×n digital image, an image rotation chip for generating a rotated version of the digital image and an output device for receiving the rotated version of the digital image, the image rotation chip comprising:

an input/output bus for receiving sequentially a stream of data defining the n×n digital image, the n×n image comprising a plurality of p×p image sections, where p is less than n;

a first memory buffer in communication with the bus having the capacity to successively store each of the plurality of p×p image sections of the n×n digital image;

a first processing module in communication with the first memory buffer for rotating and compressing each p×p image section of the image stored in the first memory buffer;

a memory module in communication with the first processing module having the capacity to store the plurality of p×p rotated compressed image sections of the image in random memory locations; and a second processing module in communication with the second memory buffers for decompressing at least one rotated compressed p×p section of the image, in response to a request from an output device to create a sequential stream of data defining a rotated digital image for the output device.

10. The image processing system of claim 9, the second processing module further comprising a determination module for determining whether other rotated compressed p×p image sections exist.

11. The image processing system of claim 10, wherein the determination module determines if other rotated compressed p×p image sections exist, in response to a signal from an output device requesting additional image sections.

12. The image processing system of claim 10, wherein the second processing module decompresses the other rotated compressed p×p image sections, and combines the decompressed p×p image sections to create a sequential stream of data defining a rotated version of the digital image for the output device.

13. The image processing system of claim 9, wherein the image sections are stored in the second memory buffers in a random order, independent of the order in which the image sections appear in the digital image.

14. The image processing system of claim 13, wherein the random memory locations are not contiguous.

15. A method for rotating a digital image comprising:

receiving sequentially a data stream defining an n×n digital image;

dividing the digital image into a plurality of p×p partial images, the value of p being less than the value of n;

rotating and compressing each of the plurality of partial images independently of the other partial images;

storing each of the plurality of rotated partial images in a p×p memory buffer in random locations in memory;

decompressing each of the plurality of rotated compressed partial images;

retrieving a plurality of rotated decompressed partial images from the p×p memory buffers; and combining the plurality of rotated partial images according to a predetermined sequence to create a rotated version of the digital image.

16. The method according to claim 15, wherein the predetermined sequence is dependent upon the compression technique.

17. The method according to claim 15, wherein the rotated version of the digital image is a rotated version of at least one section of the image.

18. The method according to claim 15, wherein the random memory locations are not contiguous.

19. The method according to claim 15, further comprising:

storing in a temporal memory buffer, at least one of the rotated decompressed partial images; and transferring at least one partial image to an output device.

20. The method of claim 15, further comprising:

decompressing of the plurality of rotated compressed partial images using at least one of the following techniques: MH, MR, MMR, JBIG and JPEG.

* * * * *